(12) United States Patent
Kuwahara et al.

(10) Patent No.: US 10,077,081 B2
(45) Date of Patent: Sep. 18, 2018

(54) VEHICLE ROOF STRUCTURE AND METHOD FOR MANUFACTURING VEHICLE ROOF STRUCTURE

(71) Applicant: HONDA MOTOR CO., LTD., Tokyo (JP)

(72) Inventors: Hiroki Kuwahara, Tochigi (JP); Hiroki Fujiuchi, Tochigi (JP); Takahiro Morita, Tochigi (JP); Akira Goto, Tochigi (JP); Keiji Otsuka, Tochigi (JP); Sumitomo Watanabe, Tochigi (JP); Toru Kumagai, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/515,335

(22) PCT Filed: Sep. 30, 2015

(86) PCT No.: PCT/JP2015/077701
§ 371 (c)(1),
(2) Date: Mar. 29, 2017

(87) PCT Pub. No.: WO2016/052602
PCT Pub. Date: Apr. 7, 2016

(65) Prior Publication Data
US 2017/0233014 A1    Aug. 17, 2017

(30) Foreign Application Priority Data

Oct. 3, 2014 (JP) .................................. 2014-204647

(51) Int. Cl.
*B62D 27/02* (2006.01)
*B62D 25/06* (2006.01)
(Continued)

(52) U.S. Cl.
CPC .......... *B62D 27/023* (2013.01); *B23K 1/0008* (2013.01); *B23K 1/0056* (2013.01); *B62D 25/06* (2013.01); *B23K 2201/006* (2013.01)

(58) Field of Classification Search
CPC ....... B62D 25/06; B62D 25/02; B62D 27/023
(Continued)

(56) References Cited

U.S. PATENT DOCUMENTS

2005/0116509 A1    6/2005    Ido et al.
2007/0236051 A1    10/2007    Poss et al.
2010/0233508 A1    9/2010    Schneegans et al.

FOREIGN PATENT DOCUMENTS

JP    2000-247259    9/2000
JP    2007-168566    7/2007
(Continued)

OTHER PUBLICATIONS

International Search Report, dated Nov. 24, 2015 (Nov. 24, 2015).

*Primary Examiner* — Dennis H Pedder
(74) *Attorney, Agent, or Firm* — Rankin, Hill & Clark LLP

(57) ABSTRACT

The vehicle roof structure includes: a closely facing section that abuts or is adjacent to a side outer panel; a negative curved-surface section that is positioned more inwards in the vehicle width direction than the closely facing section of the roof panel, and has a recessed face that is indented downwards; and a mounting surface that is formed in the side outer panel at an inner side in the vehicle width direction to downwards of the vehicle towards, and at which the closely facing section abuts or is adjacent, in which an edge, on a side of the roof panel, of the brazing material that has solidified to join the roof panel and the side outer panel is positioned on the negative curved-surface section.

2 Claims, 4 Drawing Sheets

(51) Int. Cl.
  *B23K 1/00*    (2006.01)
  *B23K 1/005*   (2006.01)
  *B23K 101/00*  (2006.01)

(58) Field of Classification Search
  USPC .......................................... 296/210, 203.03
  See application file for complete search history.

(56) References Cited

FOREIGN PATENT DOCUMENTS

| JP | 2008-000814 | 1/2008 |
| JP | 2013-146737 | 8/2013 |
| JP | 2013-189098 | 9/2013 |
| JP | 2014-019275 | 2/2014 |
| JP | 2014-147954 | 8/2014 |

VEHICLE ROOF STRUCTURE AND METHOD FOR MANUFACTURING VEHICLE ROOF STRUCTURE

TECHNICAL FIELD

The present invention relates to a vehicle roof structure and a method for manufacturing a vehicle roof structure.

BACKGROUND ART

Conventionally, a vehicle roof structure has been known in which a roof panel and side outer panels are joined by brazing material (e.g., Patent Document 1). In the vehicle roof structure described in the same publication, the brazing material interposes the gaps between the roof panel and side outer panels. The edge of the solidified brazing material is positioned on a curved surface protruding slightly upwards of the vehicle as well as protruding towards the side outer panels.

Patent Document 1: Japanese Unexamined Patent Application, Publication No. 2014-19275

DISCLOSURE OF THE INVENTION

Problems to be Solved by the Invention

With the conventional vehicle roof structure, the positions of the edges of the solidified brazing material are not stable, and the edges of the solidified brazing material have stood out. More specifically, for example, the edges of the brazing material do not have a linear form, waves appear at the edges of the brazing filler material, and it has been difficult form clean edges.

The present invention has an object of providing a vehicle roof structure and method of manufacturing this vehicle roof structure for which waves are suppressed from occurring at the edges of the brazing material joining the roof panel and side outer panels.

Means for Solving the Problems

In order to achieve the above-mentioned object, the present invention provides a vehicle roof structure having a roof panel (e.g., the roof panel 10 described later) and a side outer panel (e.g., the side outer panel 21 described later) joined by a brazing material (e.g., the brazing material 40 described later), the vehicle roof structure including: a closely facing section (e.g., the closely facing section 11 described later) that is positioned at both side parts in a vehicle width direction of the roof panel, and abuts or is adjacent to the side outer panel; a negative curved-surface section (e.g., the negative curved-surface section 12 described later) that is positioned more inwards in the vehicle width direction than the closely facing section of the roof panel, and has a recessed face (e.g., the recessed face 121 described later) that is indented downwards; and a mounting surface (e.g., the mounting surface 215 described later) that is formed in the side outer panel at an inner side in the vehicle width direction to downwards of the vehicle, and at which the closely facing section abuts or is adjacent, in which an edge (e.g., the edge 42 described later), on a side of the roof panel, of the brazing material that has solidified to join the roof panel and the side outer panel is positioned on the negative curved-surface section.

According to the present invention, the edge on a roof panel side of the brazing material that has solidified to join the roof panel and the side outer panel is positioned on the negative curved-surface section. In the case of the recessed face on the negative curved-surface section having an arc shape, for example, the indenting direction of the recessed face constituting the surface of the brazing material and the indenting direction of the recess face on the negative curved-surface section will thereby match, whereby it is possible to smoothly connect a part of the arc on the top surface of the brazing material on an upper side in the vehicle vertical direction to the part of this arc. For this reason, it is possible to suppress waves from occurring at the edge on the inner side in the vehicle width direction of the solidified brazing material on the roof panel side.

In addition, the present invention provides a method for manufacturing a vehicle roof structure having a roof panel (e.g., the roof panel 10 described later) and a side outer panel (e.g., the side outer panel 21 described later) joined by a brazing material (e.g., the brazing material 40 described later), the method including: a roof panel formation step of providing, to the roof panel, a closely facing section (e.g., the closely facing section 11 described later) that is positioned on both side parts in a vehicle width direction of the roof panel and abuts or is adjacent to the side outer panel, and a negative curved-surface section (e.g., the negative curved-surface section 12 described later) that is positioned more inwards in the vehicle width direction than the closely facing section of the roof panel, and has a recessed face (e.g., the recessed face 121 described later) that is indented downwards of a vehicle; a side outer panel formation step of providing, to the side outer panel, a mounting surface (e.g., the mounting surface 215 described later) that extends to downwards of the vehicle towards an inner side in the vehicle width direction, and at which the closely facing section abuts or is adjacent; an adjacent facing step of causing the closely facing section of the roof panel to abut or be adjacent to the mounting surface of the side outer panel; and a joining step of preheating a part of the negative curved-surface section by irradiating a laser beam (e.g., the laser beam 521 described later) onto at least the part of the negative curved-surface section, arranging the brazing material at the part of the negative curved-surface section that was preheated, joining the roof panel and the side outer panel by way of the brazing material, and arranging an edge (e.g., the edge 42 described later) on a side of the roof panel of the brazing material that has solidified on the negative curved-surface section.

According to the present invention, the joining step preheats the part of the negative curved-surface section by irradiating a laser beam onto at least the part of the negative curved-surface section, and arranges the brazing material at the part of the negative curved-surface section that was preheated to join the roof panel and the side outer panel by way of the brazing material. The wettability of the brazing material at the part of the negative curved-surface section that was preheated thereby rises, whereby the brazing material can be spread on the negative curved-surface section until a border between the part of the negative curved-surface section that was preheated and other portions of the negative curved-surface section that have not been preheated. Therefore, by positioning this border on the negative curved-surface section, it is possible to arrange, on the negative curved-surface section, the edge at a side of the roof panel of the solidified brazing material.

Then, in the roof panel formation step, the closely facing section 11 that is positioned at both side parts in the vehicle width direction of the roof panel and abuts or is adjacent to the side outer panel and the negative curved-surface section that is positioned more inwards in the vehicle width direction than the closely facing section 11 of the roof panel and has the recessed face that is indented downwards of the vehicle are provided to the roof panel. For this reason, in the case of the recessed face on the negative curved-surface section having an arc shape, it is possible to arrange the edge of the brazing material so as to smoothly connect a part of an arc of the top face of the brazing material on an upper side in the vehicle vertical direction, to this part of the arc.

Effects of the Invention

According to the present invention, it is possible to provide a vehicle roof structure and a method for manufacturing this vehicle roof structure for which waves are suppressed from occurring at edges of the brazing material joining the roof panel and the side outer panels.

PREFERRED MODE FOR CARRYING OUT THE INVENTION

An embodiment of the present invention will be explained in detail while referencing the drawings.

Figure 1:
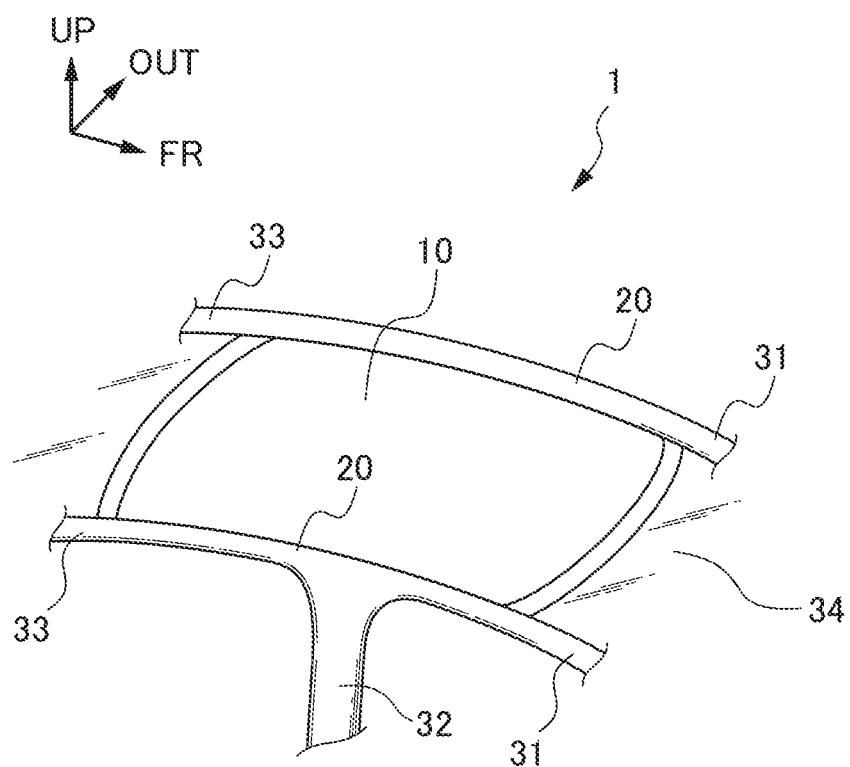
FIG. 1 is a perspective view of essential parts showing a top part of a vehicle 1 having a vehicle roof structure according to an embodiment of the present invention.
Figure 2:
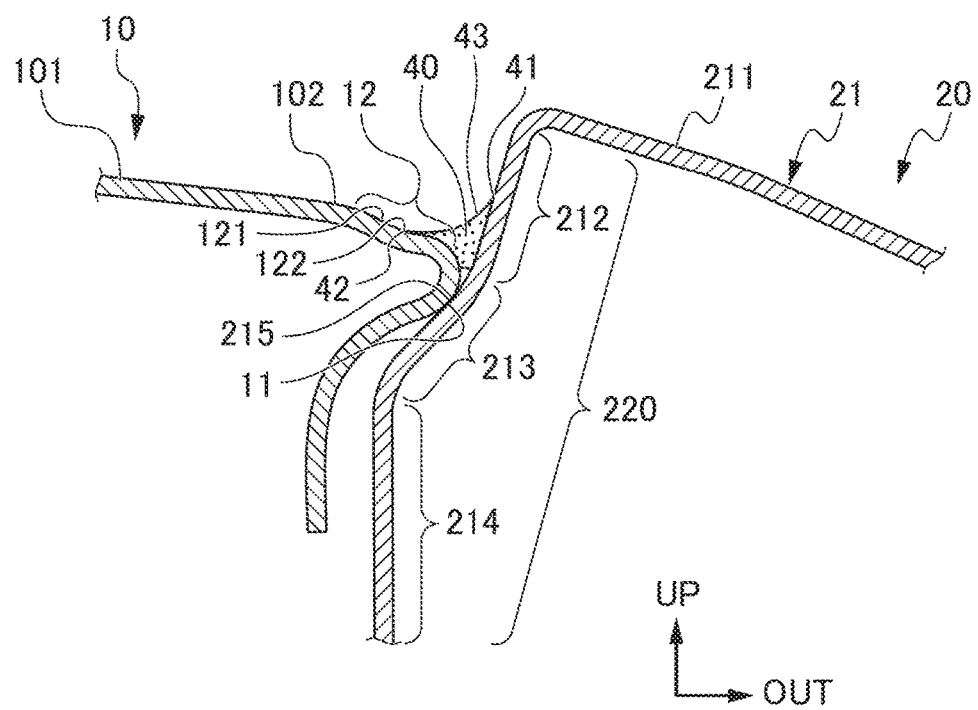
FIG. 2 is a cross-sectional view showing the vehicle roof structure according to the embodiment of the present invention.

FIG. 1 is a perspective view of essential parts showing a top part of a vehicle 1 having a vehicle roof structure according to an embodiment of the present invention. FIG. 2 is a cross-sectional view showing the vehicle roof structure according to the embodiment of the present invention. In the principal views among these drawings, the arrow FR indicates the vehicle forward direction, the arrow UP indicates the vehicle upward direction, and the arrow OUT indicates outwards in the vehicle width direction.

As shown in FIG. 1, one side part of the vehicle 1 has, in order from the vehicle front side, a front pillar 31, a center pillar 32 and a rear pillar 33, which are respectively configured from a steel material. Similarly, the other side part of the vehicle 1 has a front filler 31, a center pillar (not illustrated and a rear pillar 33. At the other side part of the vehicle 1, the top part of the vehicle 1 above the front pillar 31, center pillar 32 and rear pillar 33 has a roof side rail 20. The roof side rail 20 extends substantially along the vehicle front/rear direction, and is configured from a steel material. The roof side rail 20 is connected to the front pillar 31, center pillar 32 and rear pillar 33. Similarly, on the other side part of the vehicle 1, the roof side rail 20 is connected to the front pillar 31, center pillar (not illustrated) and rear pillar 33, and constitutes a vehicle frame member arranged with the substantial vehicle front/rear direction as the longitudinal direction.

In addition, the top part of the vehicle 1 has a roof panel 10 configured from a steel material. The roof panel 10 is configured so as to span between the pair of roof side rails 20, 20, and extends in the vehicle width direction and vehicle front/rear direction. The roof panel 10 has a windshield glass 34 arranged between the front pillars 31, 31, to be at a vehicle forward side of the roof panel 10.

As shown in FIG. 2, the vehicle roof structure includes a closely facing section 11, negative curved-surface section 12, mounting surface 215 and brazing material 40. More specifically, the roof side rail 20 has a side outer panel 21. The side outer panel 21 has a main section 211 that extends outwards in the vehicle width direction. The side outer panel 21 has a joining wall 220 that extends over substantially the entire area in the vehicle front/rear direction, more inwards in the vehicle width direction than the main section 211. The roof panel 10 is joined to the joining wall 220.

As shown in FIG. 2, the joining wall 220 of the side outer panel 21 has an upper section 212, mounting section 213 and vertical wall section 214. The upper section 212 extends so as to slope downwards of the vehicle as approaching inwards in the vehicle width direction from the main section 211. The upper section 212 extends more upwards than a portion of a top surface 102 of a roof main section 101 of the roof panel 10, which is a portion of the top surface 102 in the vicinity of the negative curved-surface section 12 at both ends in the vehicle width direction of the roof panel 10, and is integrally joined to the main section 211.

The mounting section 213 extends from the bottom end of the upper section 212 so as to slope downwards of the vehicle as approaching inwards in the vehicle width direction. The mounting section 213 is formed to have a slope closer to horizontal than the upper section 212. The surface of the mounting section 213 inwards in the vehicle width direction (face on an upper side in the vehicle vertical direction) constitutes the mounting surface 215. In other words, the mounting surface 215 is formed in the side outer panel 21 at an inner side in the vehicle width direction to downwards of the vehicle. The closely facing section 11 abuts the mounting surface 215, or closely faces via a slight gap. It should be noted that a state in which the closely facing section 11 is abutting the mounting surface 215 is shown in FIG. 2. The vertical wall section 214 extends from the bottom end of the mounting section 213 to downwards of the vehicle.

The roof panel 10 is formed in a gentle curved shape making a convexity at an upper side of the vehicle, and the central part of the roof panel 10 has the roof main section 101. The closely facing section 11 is positioned at both side parts in the vehicle width direction of the roof panel 10, and abuts the mounting section 213 of the side outer panel 21, or closely faces via a slight gap. More specifically, the closely facing section 11 is provided at both ends (both side parts) in the vehicle width direction of the roof main section 101. The closely facing section 11 opposes the mounting section 213 of the joining wall 220 of the side outer panel 21, and is joined to the joining wall 220. The closely facing section 11 is provided over substantially the entire area in the vehicle front/rear direction.

In addition, the roof panel 10 has the negative curved-surface section 12. The negative curved-surface section 12 is positioned more inwards in the vehicle width direction than the closely facing section 11. As shown in FIG. 2, the negative curved-surface section 12 has a recessed face 121 indented to a lower side in the vehicle vertical direction. The recessed face 121 is indented to downwards in the vehicle vertical direction to have a shape forming part of an arc in a cross section parallel to the vehicle vertical direction and vehicle width direction, as shown in FIG. 2. The recessed face 121 extends in the vehicle front/rear direction.

The brazing material 40 may be a so-called hard solder such as copper brazing filler, brass brazing filler and silver-alloy brazing filler. However, when establishing a hot-dip galvanized steel sheet with a sheet thickness on the order of 1.0 mm as the joined material (roof panel 10, side outer panel 21), a Cu—Zn-based brazing filler containing 5 to 15% by mass zinc and with the remainder of copper and unavoidable impurities is preferable. In addition, a Cu—Zn—Mg-based brazing filler containing 5 to 15% by mass of zinc and no more than 6% by mass manganese and with the remainder of copper and unavoidable impurities may be used.

As shown in FIG. 2, the brazing material 40 joins and fixes the roof panel 10 and side outer panel 21 by solidifying so as to span between the roof panel 10 and side outer panel 21. The edge 41 of the solidified brazing material 40 at the upper side in the vehicle vertical direction on a side of the side outer panel 21 is positioned at the upper section 212 of the side outer panel 21. The edge 42 of the solidified brazing material 40 at the inner side in the vehicle width direction on a side of the roof panel 10 is positioned at the most indented portion 122 of the recessed face 121 on the negative curved-surface section 12. The indenting direction of the recessed face constituting a top face 43 of the brazing material 40 and the indenting direction of the recessed face 121 on the negative curved-surface section match (each matches in being substantially downwards of the vehicle), and as shown in FIG. 2, a part of an arc in the top face 43 of the brazing material 40 at an upper side in the vehicle vertical direction is smoothly connected to a part of an arc of the recessed face 121 on the negative curved-surface section 12. For this reason, the edge 42 of the solidified brazing material 40 at an inner side in the vehicle width direction on a side of the roof panel 10 has a substantially linearly shape in which waves are suppressed in the vehicle front/rear direction.

Next, a method for manufacturing a vehicle roof structure having the above-mentioned configuration will be explained.

The method for manufacturing the vehicle roof structure includes a roof panel formation step, side outer panel formation step, closely facing step, and joining step.

In the roof panel formation step, the roof panel 10 is molded by press molding a sheet material by way of a press working machine (not illustrated). According to this press molding, as shown in FIG. 2, the closely facing section 11 of the roof panel 10 positioned at both side parts thereof in the vehicle width direction, which abuts the side outer panel 21 or is adjacent, and the negative curved-surface section 12 of the roof panel 10 that is positioned more inwards in the vehicle width direction than the closely facing section 11 and has the recessed face 121 indented downwards are formed in the roof panel 10.

In the side outer panel formation step, the side outer panel 21 is molded by press molding a sheet material by way of a press working machine. According to this press molding, the mounting surface 215 extending towards downwards of the vehicle at an inner side in the vehicle width direction, and at which the closely facing section 11 abuts or is adjacent, is formed in the side outer panel 21. It should be noted that the roof panel formation step and side outer panel formation step may be performed with either one earlier, and may be performed simultaneously in parallel.

In the adjacent facing step, the closely facing section 11 of the roof panel 10 is made to abut, or made to adjacently face via a slight gap, the mounting surface 215 of the side outer panel 21. In the joining step, a laser beam 521 is irradiated on a part of the side outer panel 21 and a part of the negative curved-surface section 12 to preheat the part of the negative curved-surface section 12. Next, the brazing material 40 is arranged at the part of the negative curved-surface section 12 that was preheated, and the roof panel 10 and side outer panel 21 are joined by allowing the brazing material 40 to solidify. The edge 42 of the solidified brazing material 40 on a side of the roof panel 10 is arranged on the negative curved-surface section 12.

Figure 3:
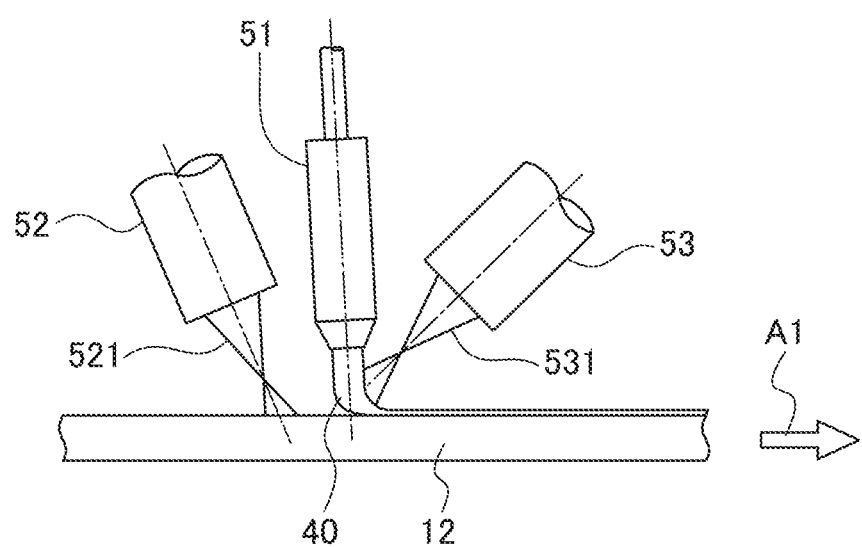
FIG. 3 is a schematic view showing an aspect of joining a roof panel 10 and a side outer panel 21 of the vehicle roof structure according to the embodiment of the present invention by way of a brazing material 40.

In the aforementioned joining step, the details of the process of irradiating the laser beam 521 onto the part of the side outer panel 21 and the part of the negative curved-surface section 12, and processes such as arranging the brazing material 40 at the part of the negative curved-surface section 12 that was preheated are as follows. FIG. 3 is a schematic view showing an aspect of joining the roof panel 10 and side outer panel 21 of the vehicle roof structure according to the embodiment of the present invention by way of the brazing material 40.

First, a blast nozzle (not illustrated) is made to face the brazing material 40 of thin round bar form, and a fine slurry is sprayed at high speed from this blast nozzle (not illustrated). At this time, it is unnecessary to blast treat the entire circumference of the brazing material 40, and it is sufficient to blast treat only a portion to which the laser beam will be irradiated later. For this reason, for example, a mask (not illustrated) is added to or covers the brazing material 40. Since the location of the brazing material 40 impinged by the slurry is recessed, the surface of the brazing material 40 becomes rough.

Next, as shown in FIG. 3, the brazing material 40 is led by a brazing material guide 51 to be fed to a part of the side outer panel 21 and a part of the negative curved-surface section 12. It should be noted that, for convenience of explanation, the side outer panel 21 is not illustrated in FIG. 3, and the negative curved-surface section 12 is illustrated. Preceding this, a preheating beam irradiation tube 52 is arranged ahead of the brazing material guide 51 (left side of brazing material guide in FIG. 3), and a temperature decline of the brazing material 40 is prevented by preheating a part of the upper section 212 of the side outer panel 21 and the part of the negative curved-surface section 12 with the laser beam 521. In particular, a preheated portion of the part of the negative curved-surface section 12 is a portion of the part of the negative curved-surface section 12 at which the brazing material 40 is arranged. More specifically, it is a portion on the outer side in the vehicle width direction from the most indented portion 122 of the recessed face 121 of the negative curved-surface section 12 shown in FIG. 2. The wettability of the brazing material 40 at this preheated portion is raised, the brazing material 40 flows, and as shown in FIG. 2, widens until the most indented portion 122 of the recessed face 121 of the negative curved-surface section 12 that is the border line between the preheated portion and a portion not preheated.

By preheating in this way, the burden of the laser beam 531 irradiating from the beam irradiation tube 53 is reduced, and the required laser output can be decreased. Additionally, by preheating the part of the side outer panel 21 and the part of the negative curved-surface section 12 with the laser beam 521, it is possible to improve the wettability of the brazing material 40 relative to these. As a result thereof, the roof panel 10 and side outer panel 21 can be efficiently joined with the brazing material 40 by causing the part of the side outer panel 21 and the part of the negative curved-surface section 12 to move in the direction of the arrow A1 at a constant speed, whereby stable brazing can be performed. It should be noted that the part of the side outer panel 21 and the part of the negative curved-surface section 12 may be held still, and the brazing material guide 51 and beam irradiation tube 53 may be made to move in the opposite direction from the arrow A1.

The following effects are exerted according to the present embodiment.

In the present embodiment, the vehicle roof structure having the roof panel 10 and side outer panel 21 joined by the brazing material 40 includes: the closely facing section 11 that is positioned at both side parts in a vehicle width direction of the roof panel 10, and abuts or is adjacent to the side outer panel 21; the negative curved-surface section 12 that is positioned more inwards in the vehicle width direction than the closely facing section 11 of the roof panel 10, and has a recessed face 121 that is indented downwards; and the mounting surface 215 that is formed in the side outer panel 21 at an inner side in the vehicle width direction to downwards of the vehicle towards, and at which the closely facing section 11 abuts or is adjacent, in which an edge 42, on a side of the roof panel 10, of the brazing material 40 that has solidified to join the roof panel 10 and the side outer panel 21 is positioned on the negative curved-surface section 12.

Figure 4:
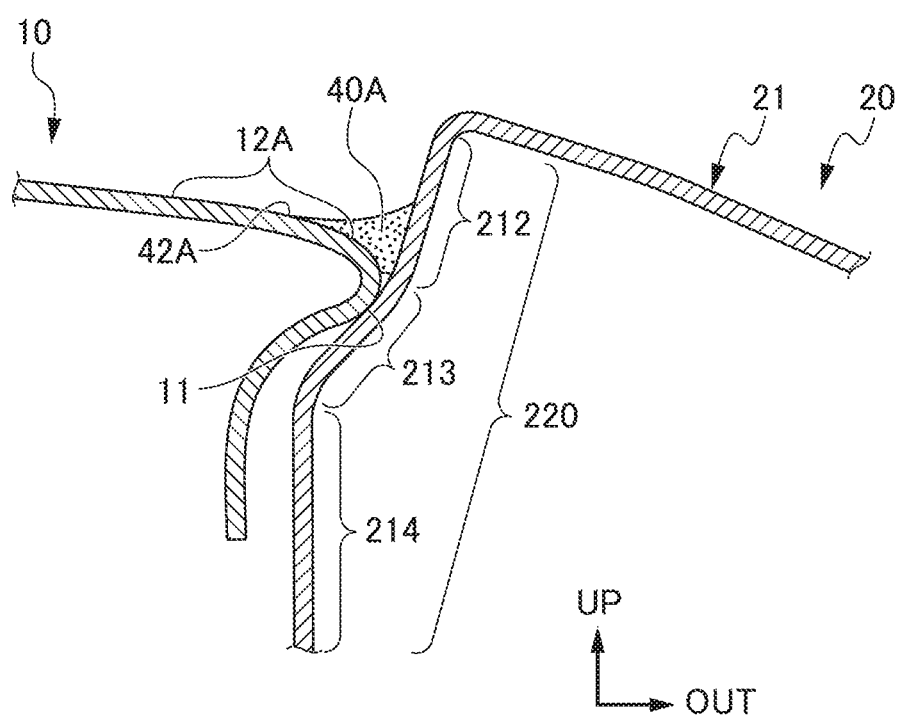
FIG. 4 is a cross-sectional view showing a conventional vehicle roof structure.

The indenting direction of the recessed face constituting the top face 43 of the brazing material 40 and the indenting direction of the recessed face 121 on the negative curved-surface section thereby match (each substantially matches in being downwards of the vehicle), and thus it is possible to smoothly connect a part of an arc of the recessed face 121 on the negative curved-surface section 12 having this arc shape, and a part of an arc of the top face 43 of the brazing material 40 on an upper side in the vehicle vertical direction. For this reason, it is possible to suppress waves from occurring in the edge 42 of the solidified brazing material 40 at the inner side in the vehicle width direction on a side of the roof panel 10. For example, as shown in FIG. 4, in the case of an edge 42A of solidified brazing material 40A at an inner side in the vehicle width direction on a side of the roof panel 10 being positioned on a negative curved-surface section 12A forming a convexity to upwards of the vehicle, the negative curved-surface section 12A forming the convexity upwards of the vehicle and a part of an arc of the top face 43 of the brazing material 40 on an upper side in the vehicle vertical direction will not be smoothly connected, and waves will tend to occur. FIG. 4 is a cross-sectional view showing a conventional vehicle roof structure. In the present embodiment, it is possible to suppress the occurrence of such defects.

In addition, in the present embodiment, the method for manufacturing a vehicle roof structure in which the roof panel 10 and the side outer panel 21 are joined by the brazing material 40 includes a roof panel formation step, a side outer panel formation step, a closely facing step and a joining step. The roof panel formation step provides, to the roof panel 10, the closely facing section 11 that is positioned at both side parts in the vehicle width direction of the roof panel 10 and abuts or is adjacent to the side outer panel 21, and the negative curved-surface section 12 that is positioned more inwards in the vehicle width direction than the closely facing section 11 of the roof panel 10, and has the recessed face 121 that is indented downwards of the vehicle. The side outer panel formation step provides, to the side outer panel 21, the mounting surface 215 that extends to downwards of the vehicle at an inner side in the vehicle width direction, and at which the closely facing section 11 abuts or is adjacent. In the adjacent facing step, the closely facing section 11 of the roof panel 10 is made to abut or be adjacent to the mounting surface 215 of the side outer panel 21. In the joining step, a part of the negative curved-surface section 12 is preheated by irradiating a laser beam onto at least the part of the negative curved-surface section 12, the brazing material 40 is arranged at the part of the negative curved-surface section 12 that was preheated to join the roof panel 10 and the side outer panel 21 by way of the brazing material 40, and the edge 42 of the brazing material 40 that has solidified on a side of the roof panel 10 is arranged on the negative curved-surface section 12.

The wettability of the brazing material 40 at the part of the negative curved-surface section 12 that was preheated thereby rises, whereby the brazing material 40 can be spread on the negative curved-surface section 12 until a border between the part of the negative curved-surface section 12 that was preheated and other portions of the negative curved-surface section 12 that have not been preheated. Therefore, by positioning this border on the negative curved-surface section 12, it is possible to arrange the edge 42 at a side of the roof panel 10 of the solidified brazing material 40 on the negative curved-surface section 12.

Then, in the roof panel formation step, the closely facing section 11 that is positioned at both side parts in the vehicle width direction of the roof panel 10 and abuts or is adjacent to the side outer panel 21, and the negative curved-surface section 12 that is positioned more inwards in the vehicle width direction than the closely facing section 11 of the roof panel 10 and has the recessed face 121 that is indented downwards of the vehicle are provided to the roof panel 10. For this reason, it is possible to arrange the edge 42 of the brazing material 40 so as to smoothly connect a part of an arc of the top face 43 of the brazing material 40 on an upper side in the vehicle vertical direction, to a part of an arc of the recessed face 121 on the negative curved-surface section 12 having an arc shape.

The present invention is not to be limited to the above-mentioned embodiments, and modification, improvements, etc. within a scope that can achieve the object of the present invention are also encompassed by the present invention.

For example, in the present embodiment, although the part of the side outer panel 21 and the part of the negative curved-surface section 12 are preheated, it is not limited thereto. It is sufficient to preheat a part of the negative curved-surface section 12 by irradiating a laser beam onto at least the part of the negative curved-surface section 12. In addition, the shape and configuration of each part of the vehicle roof structure are not limited to the shapes and configurations of the respective parts of the vehicle roof structure in the present embodiment.

EXPLANATION OF REFERENCE NUMERALS 10 roof panel
11 closely facing section
12 negative curved-surface section
20 side outer panel
40 brazing material
52 edge
121 recessed face
215 mounting surface
521 laser beam

The invention claimed is:
1. A vehicle roof structure having a roof panel and side outer panel joined by a brazing material, the vehicle roof structure comprising:

a closely facing section that is positioned at both side parts in a vehicle width direction of the roof panel, and abuts or is adjacent to the side outer panel;

a negative curved-surface section that is positioned more inwards in the vehicle width direction than the closely facing section of the roof panel, and has a recessed face that is indented downwards to have a shape forming a part of an arc; and a mounting surface that is formed in the side outer panel at an inner side in the vehicle width direction to downwards of the vehicle, and at which the closely facing section abuts or is adjacent, wherein an indenting direction of a recessed face constituting a top face of the brazing material and an indenting direction of the recessed face on the negative curved-surface section match, and wherein an edge, on a side of the roof panel, of the brazing material that has solidified to join the roof panel and the side outer panel is positioned on the negative curved-surface section, and a part of an arc on the top face of the brazing material is smoothly connected to the part of the arc of the recessed face on the negative curved-surface section.

2. A method for manufacturing a vehicle roof structure having a roof panel and a side outer panel joined by a brazing material, the method comprising:

a roof panel formation step of providing, to the roof panel, a closely facing section that is positioned on both side parts in a vehicle width direction of the roof panel and abuts or is adjacent to the side outer panel, and a negative curved-surface section that is positioned more inwards in the vehicle width direction than the closely facing section of the roof panel, and has a recessed face that is indented downwards of a vehicle to have a shape forming a part of an arc;

a side outer panel formation step of providing, to the side outer panel, a mounting surface that extends to downwards of the vehicle towards an inner side in the vehicle width direction, and at which the closely facing section abuts or is adjacent;

an adjacent facing step of causing the closely facing section of the roof panel to abut or be adjacent to the mounting surface of the side outer panel; and a joining step of preheating a part of the negative curved-surface section by irradiating a laser beam onto at least the part of the negative curved-surface section, arranging the brazing material at the part of the negative curved-surface section that was preheated, joining the roof panel and the side outer panel by way of the brazing material, matching an indenting direction of a recessed face constituting a top face of the brazing material to an indenting direction of the recessed face on the negative curved-surface section, arranging an edge on a side of the roof panel of the brazing material that has solidified on the negative curved-surface section, and smoothly connecting a part of an arc on the top face of the brazing material to the part of the arc of the recessed face on the negative curved-surface section.

* * * * *

UNITED STATES PATENT AND TRADEMARK OFFICE
CERTIFICATE OF CORRECTION

PATENT NO. : 10,077,081 B2
APPLICATION NO. : 15/515335
DATED : September 18, 2018
INVENTOR(S) : Kuwahara et al.

Page 1 of 1

It is certified that error appears in the above-identified patent and that said Letters Patent is hereby corrected as shown below:

On the Title Page

Item (72), add --Toshiyuki Horimukai, Tochigi (JP)--.

Signed and Sealed this
First Day of January, 2019

Andrei Iancu
*Director of the United States Patent and Trademark Office*